United States Patent
Büttner et al.

(10) Patent No.: US 10,745,284 B2
(45) Date of Patent: Aug. 18, 2020

(54) METHOD FOR PRODUCING AEROGELS

(71) Applicant: Interbran Systems AG, Eggenstein-Leopoldshafen (DE)

(72) Inventors: Siegmar Büttner, Viernheim (DE); Kurt Schümchen, Dahlem (DE)

(73) Assignee: Interbran Systems AG, Eggenstein-Leopoldshafen ( * ) Notice: Subject to any disclaimer, the term of this patent is extended or adjusted under 35 U.S.C. 154(b) by 326 days.

(21) Appl. No.: 15/516,528

(22) PCT Filed: Sep. 10, 2015

(86) PCT No.: PCT/EP2015/070708
§ 371 (c)(1),
(2) Date: Apr. 3, 2017

(87) PCT Pub. No.: WO2016/050474
PCT Pub. Date: Apr. 7, 2016

(65) Prior Publication Data
US 2018/0265368 A1   Sep. 20, 2018

(30) Foreign Application Priority Data

Oct. 2, 2014 (DE) .................. 10 2014 014 377
Dec. 3, 2014 (DE) .................. 10 2014 117 759

(51) Int. Cl.
| | | |
|---|---|---|
| *C01B 33/158* | (2006.01) | |
| *C01B 33/16* | (2006.01) | |
| *C01B 33/143* | (2006.01) | |
| *C01B 33/154* | (2006.01) | |
| *G02F 1/1335* | (2006.01) | |
| *G02F 1/13363* | (2006.01) | |

(52) U.S. Cl.
CPC ...... *C01B 33/1585* (2013.01); *C01B 33/1435* (2013.01); *C01B 33/1546* (2013.01); *C01B 33/16* (2013.01); *G02F 1/133502* (2013.01); *G02F 1/133634* (2013.01)

(58) Field of Classification Search
None
See application file for complete search history.

(56) References Cited

U.S. PATENT DOCUMENTS

| | | | | |
|---|---|---|---|---|
| 4,667,417 A | * | 5/1987 | Graser | B01D 11/0203 34/337 |
| 5,888,425 A | * | 3/1999 | Schwertfeger | C01B 33/16 427/220 |
| 6,197,270 B1 | * | 3/2001 | Sonoda | C01B 33/1585 423/338 |
| 9,834,446 B2 | * | 12/2017 | Kim | B01J 13/0091 |
| 2001/0034375 A1 | * | 10/2001 | Schwertfeger | B01J 13/0091 516/98 |
| 2003/0207950 A1 | * | 11/2003 | Schwertfeger | C01B 33/1546 516/100 |
| 2008/0316404 A1 | | 12/2008 | Yamaki et al. | |
| 2011/0237692 A1 | * | 9/2011 | Wu | C08G 63/00 521/64 |
| 2016/0280557 A1 | * | 9/2016 | Kim | B01J 13/0091 |

FOREIGN PATENT DOCUMENTS

| | | |
|---|---|---|
| CN | 102765725 A | 11/2012 |
| DE | 4002287 A1 | 9/1990 |
| DE | 19502453 C1 | 9/1996 |
| EP | 0849220 A1 | 6/1998 |
| JP | 2002509069 A | 3/2002 |
| JP | 2003212999 A | 7/2003 |
| JP | 2012144428 A | 8/2012 |
| KR | 20110125773 A | 11/2011 |
| KR | 20120070948 A | 7/2012 |
| KR | 20150093063 A | 8/2015 |
| WO | 2015119431 A1 | 10/2015 |

OTHER PUBLICATIONS

A. V. Rao et al.: "Comparative studies on the surface chemical modification of silica aerogels based on various organosilane compounds of the type RnSiX4-n", Journal of Non-Crystalline Solids, 350, 2004, Seiten 216 bis 223.

* cited by examiner

Primary Examiner — Colleen P Dunn
(74) Attorney, Agent, or Firm — Edward E. Sowers; Brannon Sowers & Cracraft PC

(57) ABSTRACT

The invention relates to a method for producing aerogels, in particular silica aerogels, by way of a sol-gel process.

20 Claims, No Drawings

METHOD FOR PRODUCING AEROGELS

CROSS-REFERENCES TO RELATED APPLICATIONS

This application is a National Stage filing of International Application PCT/EP 2015/070708, filed Sep. 10, 2015, entitled METHOD FOR PRODUCING AEROGELS, claiming priority to DE 10 2014 014 377.5 filed Oct. 2, 2014, and to DE 10 2014 117 759.2 filed Dec. 3, 2014. The subject application claims priority to PCT/EP 2015/070708, to DE 10 2014 014 377.5, and to DE 10 2014 117 759.2, and incorporates all by reference herein, in their entirety.

BACKGROUND OF THE INVENTION

The present invention relates to the technical field of aerogels, especially silica aerogels.

In particular, the present invention relates to a method for producing aerogels and also to the aerogels obtainable by the method of the present invention and their uses, particularly in insulants. The present invention further relates to a method for drying aerogels.

Silicate-based aerogels, i.e., silica aerogels, derive from orthosilicic acid $H_4SiO_4$ and its products of condensation. They are highly porous solids having a pore volume of generally 95% to 99.8% by volume, based on the total volume of the aerogel. Owing to their high porosity, aerogels are poor conductors of heat and sound and as such of interest for the development of insulating and isolating materials.

However, aerogels are largely confined to some specialty applications in the area of isolant and insulant materials, since their high porosity makes aerogels extremely fragile solid-state structures destroyed even by relatively low mechanical stress. In addition, the preparation of aerogels is very costly and inconvenient, explaining why aerogels have hitherto not been commercially useful in isolating and insulating materials.

Initial syntheses of silica aerogel are known to date from the 1930s. Silica aerogel is typically produced by the sol-gel process. The starting point for a conventional synthesis of aerogel is a dilute sodium silicate solution, which is acidified with hydrochloric acid to precipitate an amorphous gel known as a hydrogel. Said gel is dried in an autoclave under supercritical conditions, which makes this process very inconvenient and costly, to obtain an aerogel. Supercritical drying of the aerogel, or removal of the solvent, is to necessary because otherwise, owing to the highly porous structure of the aerogel, the capillary forces acting during solvent removal destroy the solid-state structure of the aerogel.

Alternative methods for producing silicate-based aerogels proceed from the hydrolysis of organosilanes, for example tetramethoxyorthosilicate and/or tetraethoxyorthosilicate, and likewise involve a step of forming a hydrogel or, to be more precise, an alkogel and a step of removing the solvent in the supercritical domain. In developments seeking to simplify the process and improve its energy efficiency, the solvent or solvent mixture can be replaced by carbon dioxide which in turn is removed by supercritical drying. But even this version of the process is too inconvenient for cost-effective practice on an industrial scale.

There have additionally also been proposals seeking to develop approaches based on drying the aerogel under more moderate conditions. They generally involve a step in which the hydrogel/alkogel obtained is subjected to hydrophobicization, especially by silylation, for example with dimethyl-chlorosilane or trimethylchlorosilane. This is followed by a solvent exchange of the polar solvent present in the reaction mixture for an apolar solvent in order to yet further reduce the surface tension and thus the capillary forces. Such surface-modified hydrogels/alkogels are convertible into aerogels by distillatively removing the solvent and subsequently drying the hydrogel/alkogel at temperatures above 100° C. While the capillary forces cause the aerogel to shrink during the drying process, it is not destroyed and returns to its original shape on completion of drying.

Since, however, these methods are also very inconvenient and time intensive and, what is more, they generally lead to aerogels barely capable of withstanding mechanical stresses, there are endeavors seeking to further optimize the production methods for aerogels and also the physical parameters of aerogels.

DE 195 38 33 A1 thus describes a method for subcritical production of aerogels wherein hydrosol is sprayed into paraffin to create sol spheres having a predetermined diameter and, after gel formation, the spheres are again treated with a polysilicic acid solution. This is optionally followed by a hydrophobicization and a subsequent solvent exchange. Finally, the aerogel obtained is dried under supercritical conditions.

DE 195 41 992 A1 relates to a method for producing inorganically modified aerogels by use of alcohols, which comprises adding an inorganic acid to an aqueous waterglass solution to produce a hydrosol and removing the resultant salts to a very substantial extent. The gel is subsequently washed with an organic solvent in order to get the water content below 5 wt %, which is followed by a surface-modifying step and a subsequent step of drying the gel obtained.

DE 196 48 798 C2 further relates to a method for producing organically modified aerogels by surface-modifying the aqueous gel without prior solvent exchange and then drying.

DE 197 52 456 A1 relates to a method for producing organically modified aerogels starting from silicon tetrachloride.

Lastly, EP 0 171 722 A1 relates to a method for drying hydrogels, specifically silicate-based hydrogels, wherein the first step comprises exchanging the water content of the hydrogel for methanol, which is then in turn replaced by carbon dioxide. The carbon dioxide is finally removed under supercritical conditions.

All these methods, however, fail to provide a particulate, mechanically sufficiently stable aerogel under economically sensible conditions which is potentially capable of achieving wide use in isolating and insulating materials.

Moreover, the prior art methods reviewed are all without exception complex multi-step processes which are typically possible only with the use of numerous organic solvents and further additives. Since the chemistries used are often corrosive, poisonous and/or flammable, or used under high pressure, special safety precautions have to be taken to handle these chemistries and to dispose of them. This drives up the costs of aerogel production still further, resulting in silica aerogels currently having to be priced at up to € 120/kg.

BRIEF SUMMARY OF THE INVENTION

It is an object of the present invention to provide an aerogel production method whereby the above-described problems and disadvantages arising in connection with the prior art should be at least substantially avoided or else at least ameliorated.

It is in particular an object of the present invention to provide a method for producing aerogels which involves very few steps, is simple to carry out and ideally eschews the use of problematic chemistries, for example flammable or poisonous solvents.

It is yet further an object of the present invention to provide an aerogel which is inexpensive to manufacture, mechanically robust and suitable for use in insulants.

The defined object stated above is achieved according to the present invention by a method as claimed in claim 1; the respective dependent claims relate to further advantageous developments and refinements of the method according to the present invention.

The present invention further provides herein, the aerogel obtainable by the method of the present invention.

The present invention yet further provides herein, the method of using the aerogel of the present invention.

The present invention finally yet further provides herein, a method for producing a silica aerogel by drying a hydrogel; the respective dependent claim relates to further advantageous developments and refinements of the method according to the present invention.

It will be readily understood that such particularities, features, elaborations, refinements and also advantages or the like as are recited hereinbelow in respect of one aspect of the present invention only, for the avoidance of unnecessary repetition, do of course also apply mutatis mutandis to the other aspects of the present invention without the need for any express mention.

It will further be readily understood that any values, numbers and ranges recited hereinbelow shall not be construed as limiting the respective value, number and range recitations; a person skilled in the art will on the contrary appreciate that in a particular case or for a particular use, departures from the recited ranges and particulars are possible without having left the realm of the present invention.

Moreover, any hereinbelow recited value/parameter particulars or the like can in principle be determined/quantified using standard/standardized or explicitly recited methods of determination or else using methods of determination/measurement which are per se familiar to a person skilled in the art.

It will yet further be readily understood that any hereinbelow recited weight- or amount-based percentages are selected by a person skilled in the art such that the sum total adds up to 100%; however, this is self-evident.

Having made that clear, the present invention will now be more particularly described.

DETAILED DESCRIPTION OF THE INVENTION

The present invention in a first aspect of the present invention thus provides a method for producing aerogels, especially silica aerogels, via a sol-gel process, wherein a hydrophobicization, especially an in situ hydrophobicization, of the gel is carried out as it is formed.

Aerogels, especially silica aerogels, are typically derived through sol-gel processes. In sol-gel processes, precursor substances, precursors for short, are converted by solvolysis or hydrolysis into the corresponding solutions or dispersions, i.e., colloidal solutions, the sol. The sol is converted by further reactions, polymerization reactions, especially condensation reactions, into high polymers, or macromolecules, i.e., the gel. When the synthesis takes place in aqueous phase, sol and gel are also referred to as hydrosol and hydrogel. Sol-gel processes are a way to provide especially polymeric materials based on nonmetallic inorganic materials and metallic materials.

A hydrophobicization is to be understood in the context of the present invention as meaning the interfacial properties of especially the gel material undergoing a change which weakens the interaction of the surface with polar chemistries. A hydrophobicization is to be understood in the context of the present invention as meaning especially a surface modification of the hydrogel. The hydrophobicization changes the surface of the gel, especially of the hydrogel, such that the interactions between the surface and polar chemistries, for example alcohols or water, are minimized.

Surprisingly, as found by Applicant, especially an in situ hydrophobicization—i.e., a hydrophobicization of the interface of the gel as the gel is being formed—during the formation of the gel, especially of the hydrogel, makes possible the synthesis of hydrophobicized aerogels in but one dissolving/dispersing medium. The interactions between the surface and polar chemistries, for example alcohols or water, are weakened in the process such that, on drying, straightforward removal of the dissolving/dispersing medium becomes possible without the aerogel structure being destroyed. This is remarkable in that especially in the production of silica aerogels, there is generally a need to carry out a time-consuming solvent exchange of alcohol or water for more apolar solvents in order to achieve complete removal of these apolar dissolving or dispersing media. It is often even necessary for the as-derived hydrogel to first be converted into an alkogel by solvent exchange before further solvent changes can then be carried out.

An in situ hydrophobicization, i.e., a hydrophobicization during the formation of the gel, in the context of the present invention delivers an efficient hydrophobicization of even the internal interfaces, especially of the pores, of the aerogel, even making possible a substantially nondestructive removal of water out of the pore system of the aerogel.

It is further preferred in the context of the present invention for the gel to be formed in the presence of one or more than one hydrophobicizing agent. Particularly good results are obtained in this context when the hydrophobicizing agent is selected from phosphonates, sulfonates, substituted amines, silanes, polysiloxanes, siliconates, carboxylic acid derivatives, ethoxylates, polyethers, especially silanes, polysiloxanes and siliconates, and also mixtures thereof. Particularly good results are obtained in the context of the present invention when silanes and/or siliconates are used as the hydrophobicizing agent. Especially the usage of polysiloxanes, siliconates and silanes as the hydrophobicizing agent appears to provide a particularly uniform incorporation into the nascent gel material, especially into silica hydrogels, ensuring an effective form of surface modification for all, including internal, that is, surfaces of the gel. Especially silanes provide a particularly pronounced form of this effect.

When a polysiloxane is used as the hydrophobicizing agent in the context of the present invention, the chemical composition of the polysiloxane may vary between wide limits. However, particularly good results are obtained on using a polysiloxane having reactive functional groups, especially selected from hydroxyl functions, amines and/or carboxylic acids. Particularly good results are likewise obtained on using a polysiloxane having a weight-average molar mass $M_w$ in the range from 250 to 50 000 g/mol, especially from 300 to 30 000 g/mol, preferably from 400 to 20 000 g/mol, more preferably from 450 to 10 000 g/mol, yet more preferably from 500 to 5000 g/mol.

When a silane is used as the hydrophobicizing agent in the context of the present invention, the chemical nature of the silane may likewise vary between wide limits. However, particularly good results are obtained on using a silane of general formula I

$$R^1_n SiR^2_{4-n} \quad (I)$$

where
n=1 to 3, especially 1 or 2, preferably 1;
$R^1$=$C_1$- to $C_{30}$-alkyl and/or $C_6$- to $C_{30}$-aryl,
  especially $C_2$- to $C_{20}$-alkyl and/or $C_6$- to $C_{20}$-aryl,
  preferably $C_3$- to $C_{20}$-alkyl and/or $C_6$- to $C_{20}$-aryl,
  more preferably $C_4$- to $C_{15}$-alkyl and/or $C_6$- to $C_{15}$-aryl,
  yet more preferably $C_5$- to $C_{12}$-alkyl and/or $C_6$- to $C_{12}$-aryl,
  most preferably $C_5$- to $C_{12}$-alkyl;
$R^2$=halide, especially chloride, bromide and/or iodide,
  OX where X=alkyl, aryl, polyether and/or carboxylic acid derivative,
    especially alkyl, preferably $C_1$- to $C_8$-alkyl,
    more preferably $C_2$- to $C_4$-alkyl.

When a siliconate is used as the hydrophobicizing agent in the context of the present invention, a multiplicity of siliconates may be used. However, particularly good results are obtained on using a siliconate of general formula II

$$HO\text{---}[Si(R)(OM)\text{-}O\text{-}]_n H \quad (II)$$

where
n=1 to 6, especially 1 to 3, preferably 1;
R=$C_1$- to $C_{10}$-alkyl and/or $C_6$- to $C_{15}$-aryl,
  especially $C_1$- to $C_8$-alkyl and/or $C_6$- to $C_{12}$-aryl,
  preferably $C_1$- to $C_8$-alkyl and/or $C_6$- to $C_{10}$-aryl,
  more preferably $C_1$- to $C_4$-alkyl,
  yet more preferably $C_1$- to $C_3$-alkyl;
M=monovalent metal,
  especially alkali metal, preferably sodium or potassium.

It will be found advantageous in this context for the hydrophobicizing agent to be selected from sodium methylsiliconate, potassium methylsiliconate, sodium propylsiliconate and potassium propylsiliconate.

In a preferred embodiment of the present invention, but one dissolving or dispersing medium is used to carry out the process. Dissolving or dispersing medium is to be understood in the context of the present invention as meaning liquid media capable of dissolving and dispersing, respectively, chemical compounds, especially salts. Dissolving media cause a segregation of individual constituent parts of chemical entities, i.e., said entities are segregated at a molecular level into individual molecules and/or constituent parts, for example ions, and then converted into solutions, where the individual constituent parts remain in permanent separation and act, macroscopically and microscopically, as a homogeneous single-phase system. A dispersion in the context of the present invention is a two-phase mixture where a first phase comprising the entity to be dispersed, which is known as the discontinuous phase, is present in a second phase, the dispersing medium and/or continuous phase, in a fine state of subdivision, especially in a homogeneous state of subdivision. However, the transition from solutions to dispersions is fluid in that, for example, colloidal solutions cannot be unambiguously assigned to either solutions or dispersions. Similarly with "solutions" of macromolecules or high polymers it is not unambiguously determinable whether there is a solution or a dispersion.

Using but one dissolving medium in the course of the method of the present invention simplifies process management quite appreciably, since the production of aerogels, especially of silica aerogels, often requires the dissolving medium to be changed multiple times. A more frequent change of solvent is technically more burdensome and greatly inconveniences the disposal of dissolving/dispersing media residues, since these often have to be collected, and disposed of, in a segregated manner.

In general, in the context of the present invention, the dissolving or dispersing medium used is a polar dissolving or dispersing medium, especially a polar protic dissolving or dispersing medium.

It will be found advantageous for the purposes of the present invention that the dissolving or dispersing medium is selected from the group of alcohols, especially $C_1$- to $C_8$-alcohols, amines or water, especially methanol, ethanol, propanol and water, preferably ethanol and water. It is particularly preferred for the purposes of the present invention, when the dissolving or dispersing medium is water. One advantage of using water is that it is neither toxic nor environmentally problematical or concerning. Water is further nonflammable and straightforward to dispose of.

In a preferred embodiment of the present invention, the present invention provides a method for producing aerogels, especially silica aerogels, especially as described above, in which
(a) a first step comprises producing a sol, especially a hydrosol; and
(b) a second and subsequent step comprises reacting the sol, especially the hydrosol, in the presence of one or more than one hydrophobicizing agent to form a gel, especially a hydrogel.

This special embodiment of the method according to the present invention is similarly susceptible to unlimited application of the features and process parameters described above, i.e., the above-described features of the method according to the present invention may also apply in an unrestricted manner to the special embodiment described.

Typically, in the context of the present invention, the sol is produced from a solution or dispersion of a precursor. It will prove advantageous in this context for the solution or dispersion to contain the precursor in amounts of 0.01 to 20 wt %, especially 0.1 to 15 wt %, preferably 0.5 to 10 wt %, more preferably 0.75 to 8 wt %, based on the solution or dispersion. The aforementioned concentration ranges provide a particularly uniform polymerization/condensation of the sol molecules/particles to obtain a particularly homogeneous gel, especially hydrogel.

The sol in the context of the present invention is obtainable from a multiplicity of possible precursor compounds. However, particularly good results are obtained on producing a hydrosol based on monosilicic acid and/or colloidal silica from an alkali metal silicate solution, especially sodium silicate solution, as precursor. The preference in the context of the present invention is for the production of silica aerogels because these have suitable physical properties for insulation purposes in particular.

When the hydrosol is produced from an alkali metal silicate solution in the context of the present invention, it will prove to be advantageous for the hydrosol to be produced by reacting the alkali metal silicate solution with a mineral acid, especially hydrochloric acid, nitric acid and/or sulfuric acid, or by ion exchange, preferably by ion exchange. Particularly good results are obtained in this context when the ion exchange is carried out with a strongly acidic cation exchange resin, especially a sulfonated polystyrene resin, preferably a sulfonated divinylbenzene-crosslinked polystyrene resin. The use of ion exchangers, especially of ion exchangers based on sulfonated divinylbenzene-crosslinked polystyrene resins, leads to particularly pure hydrosols which are nearly free of salts, especially disruptive ions, which interfere with the polymerization of the aerogel and/or lead to dislocations.

It will prove advantageous in the context of the present invention for the sol to have a pH in the range from 1 to 6, especially from 2 to 4, preferably from 2 to 3. Similarly, in the context of the present invention, good results are obtained when the sol has a pH of less than 6, especially less than 4, especially less than 3. The aforementioned pH values provide a particularly homogeneous state of subdivision for ideally low molecular weight sol molecules/particles.

It is further advantageous in the context of the present invention when the sol has a 20° C. conductivity of not more than 1200 µS/cm, especially not more than 1100 µS/cm, preferably not more than 1000 µS/cm. Particularly good results are similarly obtained when the sol has a 20° C. conductivity in the range from 10 to 1200 µS/cm, especially from 20 to 1100 µS/cm, preferably from 30 to 1000 µS/cm. Low conductivity values indicate that the sol is substantially free of ions, especially of extraneous ions, which adversely affect the subsequent polymerization/condensation to form the gel.

Step (a) is typically carried out at room temperature or in a temperature range from 20 to 30° C.

In a preferred embodiment of the present invention, in step (b), especially at the start of step (b), the pH of the solution or dispersion, especially of the sol obtained in step (a), is established in the range from 3.5 to 7, especially from 3.5 to 6.5, preferably from 4 to 6. In the aforementioned range, a particularly uniform and controlled polymerization/condensation of the sol to form the gel, especially of silica hydrosols to hydrogels, takes place. The establishment of the pH in step (b), then, may be accomplished in various ways. However, particularly good results are obtained in the context of the present invention when the pH is established by admixing a base, especially by admixing aqueous sodium hydroxide solution, aqueous potassium hydroxide solution and/or aqueous ammonia solution, preferably aqueous ammonia solution. The use of ammonia solution is especially advantageous because the resulting ammonium ions do not adversely affect the polymerization/condensation of the sol to the gel and also are not incorporated in the gel structure, like for instance sodium or potassium ions.

It may similarly be provided that the pH is established by admixing an acid, especially a mineral acid, preferably hydrochloric acid. Establishing the pH by admixing an acid is especially may be especially necessary when strongly basic hydrophobicizing agents, for example siliconates, are used.

In general, the hydrophobicizing agent is used in the form of a solution or dispersion, especially in the form of an aqueous solution or dispersion, in the context of the present invention. The concentration of the hydrophobicizing agent in the solution or dispersion may vary between wide limits. However, particularly good results are obtained when the solution or dispersion contains the hydrophobicizing agent in amounts of 1 to 90 wt %, especially 10 to 80 wt %, preferably 30 to 70 wt %, more preferably 40 to 60 wt %, based on the solution or dispersion of the hydrophobicizing agent.

Particularly good results are obtained in the context of the present invention when the weight-based ratio of sol particles to hydrophobicizing agent is varied in the range from 10:1 to 1:20, especially from 5:1 to 1:10, preferably from 3:1 to 1:5, more preferably from 2:1 to 1:4, yet more preferably from 1:1 to 1:3. The aforementioned ratios provide particularly stable aerogels straightforward to free of dissolving/dispersing medium residues, especially water, by drying. Sol particles here are the dissolved/dispersed corpuscles of the sol, especially of the silica.

The hydrophobicizing agent is typically admixed in step (b) after the pH has been established. The hydrophobicizing agent is preferably admixed at especially from 0.1 to 60 min, preferably from 0.5 to 30 min and more preferably at from 0.5 to 15 min after establishing the pH. The admixture of the hydrophobicizing agent should take place promptly after the pH has been established and thus after the polymerization/condensation reaction of the sol particles has started. True, some relatively large aggregates of the dispersed/dissolved sol particles will have already formed at the time of an admixture in the aforementioned period, yet the polymerization is not yet so advanced as to rule out homogeneous/uniform incorporation of the hydrophobicizing agent into the interfacial areas of the resulting hydrogel particles. It is also possible to establish the pH after admixture of the hydrophobicizing agent, as especially the use of basic hydrophobicizing agents makes preferable, in order to preferentially establish the pH in the weakly acidic range.

It will similarly prove advantageous in the context of the present invention for the admixture of the hydrophobicizing agent to the sol to have been completed within a period of less than 15 minutes, especially less than 10 minutes, preferably less than 5 minutes.

The temperature at which the hydrophobicizing agent may be mixed with the sol may naturally vary between wide limits. However, it will be found advantageous for the admixture of the hydrophobicizing agent to the sol to take place at temperatures in the range from 10 to 40° C., especially from 20 to 30° C. In the context of the present invention, therefore, the admixture of the hydrophobicizing agent to the sol may take place at room temperature.

In a preferred embodiment of the present invention, step (b) comprises heating the mixture after admixing the hydrophobicizing agent to temperatures in the range from 30 to 90° C., especially from 35 to 85° C., preferably from 40 to 80° C., more preferably from 50 to 75° C., yet more preferably from 60 to 70° C. In the aforementioned temperature ranges, the condensation reaction of the sol particles is hastened to such an extent that rapid gel formation takes place, yet gel formation still proceeds at a low enough rate to form a very uniform and homogeneous porous surface structure.

The length of time for which the mixture is maintained at the elevated temperature may likewise vary between wide limits. However, it will prove advantageous for the purposes of the present invention when the mixture is maintained at the elevated temperature from 0.1 to 48 hours, especially 0.5 to 35 hours, preferably 1 to 24 hours, more preferably 1 to 12 hours, yet more preferably 2 to 8 hours. Particularly good results are likewise obtained when the mixture is maintained at the elevated temperature for less than 48 hours, especially less than 35 hours, preferably less than 24 hours, more preferably less than 12 hours and yet more preferably less than 8 hours.

In a preferred embodiment of the present invention, step (b) is followed by a step (c) of processing the gel, especially hydrogel, obtained in step (b) into an aerogel. In this context, the present invention may provide in particular that the gel, especially hydrogel, obtained in step (b) is isolated, thereafter optionally comminuted and subsequently dried.

The gel may be isolated in any desired manner, for example by decanting the dissolving/dispersing medium or by filtration. Depending on the choice of processing conditions, however, but small amounts of dissolving medium or even no free dissolving medium may be generated. The gel, especially hydrogel, obtained in step (b) is then isolated by removal from the reaction vessel, optionally comminuted and subsequently dried.

This special embodiment may provide that step (c) comprises comminuting the gel to absolute sizes in the range from 0.01 to 10 mm, especially from 0.1 to 8 mm, preferably from 0.3 to 7 mm and more preferably from 0.5 to 5 mm, for a particle. Comminution may be effected by any suitable procedures, for example by cutting or chopping with blades or with wire meshes. It is typically straightforward to comminute the gel, especially hydrogel, because it is obtained in the form of a highly viscous pasty mass. However, it will prove advantageous for the gel, especially hydrogel, to be predried for a period of 1 to 5 hours, especially 1.5 to 4 hours, preferably 2 to 3 hours, especially at room temperature in the air. This time span is often needed for the gel, especially hydrogel, to acquire during comminution the necessary firmness and dimensional stability which is necessary for the formation of discrete corpuscles/particles.

Typically, in the context of the present invention, step (c) comprises drying the gel in one or more stages.

The gel may be dried in step (c) in various ways subject to the proviso that the pore and/or solid-state structure of the gel, especially hydrogel, and/or of the resulting aerogel must not be destroyed during drying as a result of the action of strong capillary forces. Particularly good results are obtained in the context of the present invention when the gel, especially hydrogel, is dried via supercritical drying, freeze drying, thermal drying or combinations thereof.

In supercritical drying, the dissolving medium is removed from the gel, especially hydrogel, in the supercritical domain and/or the original dissolving medium is exchanged for liquid carbon dioxide which is subsequently removed under supercritical conditions. In freeze drying, typically, the gel, especially hydrogel, obtained in step (b) is, especially after prior comminution, rapidly cooled by agency of liquid nitrogen and subsequently the dissolving medium, especially water, is removed under reduced pressure by sublimation. In thermal drying, the dissolving medium is removed out of the pore and/or solid-state structure of the gel, especially hydrogel, and/or of the resulting aerogel, by temperature elevation, in which connection this step may also take place under reduced pressure.

Preferably, in the context of the present invention, the hydrogel is subjected to single-stage thermal drying. The specific method of the present invention thus makes possible the removal of the dissolving medium, especially water, out of the pore system of the gel, especially hydrogel, by heating the gel. It is especially under standard pressure, i.e., ambient pressure, that single-stage thermal drying has low equipment requirements and a particular simplicity of operation in industry. Here it will prove advantageous for the purposes of the present invention when the aerogel is dried in a conditioning chamber or an oven in order to guarantee consistent drying conditions.

The specific processing conditions for the single-stage thermal drying of the hydrogel in step (c) may naturally vary between wide limits. However, particularly good results are obtained when the gel is dried at temperatures in the range from 20 to 180° C., especially from 30 to 150° C., preferably from 40 to 120° C. and more preferably from 50 to 100° C.

The length of the drying period may also vary between wide limits. However, it will prove advantageous when the gel is dried for a period of 5 to 72 hours, especially 10 to 60 hours, preferably 24 to 48 hours. The aforementioned periods are sufficient but also necessary for complete removal of the dissolving medium.

By hydrophobicizing the gel as the gel is being formed, especially in an in situ hydrophobicization, the present invention enables the removal of even liquid water out of the capillary system of the gel, especially hydrogel, and thus the production of an aerogel in a substantially nondestructive manner. This is because the hydrophobicization, especially the in situ hydrophobicization, weakens the capillary forces in the interior of the gel, i.e., the interactions between the surface of the gel and the molecules of the dissolving/dispersing medium, to such a degree that even liquid water becomes straightforward to remove.

A likewise advantageous embodiment of the present invention provides that step (c) comprises drying the hydrogel in two or more stages, especially in two stages.

It is preferable in this connection when a first stage of drying the hydrogel comprises drying the hydrogel at temperatures in the range from 10 to 60° C., especially from 20 to 50° C., preferably from 30 to 40° C. This drying may be carried out with advantage for a period of 8 to 72 hours, especially 12 to 60 hours, preferably 24 to 48 hours. The hydrogel may be dried in the ambient air or else advantageously in a conditioning chamber which ensures particularly consistent drying conditions.

It will further prove advantageous for the purposes of the present invention when a second stage of drying the hydrogel comprises drying the hydrogel at temperatures in the range from 60 to 275° C., especially from 80 to 250° C., preferably from 100 to 230° C., more preferably from 150 to 200° C. It may be provided in this context that the second stage of drying is carried out at temperatures up to 275° C., especially up to 250° C., preferably up to 230° C., more preferably up to 200° C. It will prove advantageous in this connection when the second stage of drying is carried out for a period of 0.2 to 10 hours, especially 0.5 to 5 hours, preferably 1 to 2 hours.

The above-described multi-stage thermal form of drying is especially suitable for drying particularly sensitive and mechanically less robust aerogels. By slowly removing a large proportion of the dissolving/dispersing medium, especially liquid water, during the first subsidiary step of the drying process step and then briefly heating to higher temperatures, very gentle removal of the dissolving/dispersing medium, especially water, out of the structures of the aerogel is provided.

However, as already noted above, it is typically sufficient for the purposes of the present invention to free the hydrogel/aerogel of the dissolving medium, especially water, by single-stage thermal drying because, in the context of the present invention, hydrophobicization, especially in situ hydrophobicization, serves to reduce the interactions between polar dissolving media, especially water, and the surface of the gel, especially hydrogel, to such a degree that the fine and fragile porous structure of the gel, especially hydrogel, notwithstanding, removal of the dissolving medium is possible without destroying the pore structure and thus the aerogel.

The method of the present invention allows particularly gentle drying of gels produced by the sol-gel process, obtaining aerogels as a result. The drying process step of the present invention further allows removal of even water out of silica aerogels under mild conditions in that the aerogel has only been exposed to minimal and, what is more, reversible shrinkage during the drying process and the structure of the aerogel particles is not destroyed.

The present invention, according to a second aspect thereof, further provides an aerogel obtainable by the method described above.

In general, the aerogel has absolute sizes of 0.01 to 10 mm, especially 0.1 to 8 mm, preferably 0.3 to 7 mm, more preferably 0.5 to 5 mm for a particle.

It may further be provided that the aerogel has a bulk density of 0.05 to 0.30 g/cm$^3$, especially 0.08 to 0.25 g/cm$^3$, preferably 0.10 to 0.22 g/cm$^3$, preferably 0.12 to 0.20 g/cm$^3$.

As far as its porosity is concerned, the aerogel of the present invention typically has an average pore diameter of 10 to 300 nm, especially 40 to 250 nm, preferably 60 to 220 nm, more preferably 100 to 200 nm. It may similarly be provided that the aerogel has an average pore diameter of less than 300 nm, especially less than 250 nm, preferably less than 220 nm and more preferably less than 200 nm.

The aerogel obtainable using the method of the present invention typically has a contact angle with water of 100 to 170°, especially 130 to 165°, preferably 140 to 165°.

The aerogel obtainable using the method of the present invention is especially specifically useful for incorporation into insulants and insulating materials, especially for thermal and acoustical isolation/insulation purposes. The aerogel of the present invention is especially particularly suitable for use in, for example, insulation renders, which are particularly demanding of the mechanical robustness of the aerogel particles because, especially in the course of mechanical application of the insulation render via rendering machines, the insulation render may be exposed to a pressure of 7 to 8 bar. For further details regarding this aspect of the present invention, reference may be made to the preceding observations regarding the method of the present invention, which apply mutatis mutandis in respect of the aerogel according to the present invention.

The present invention according to a third aspect of the present invention further provides the method of using an above-described aerogel in the manufacture of building materials, especially insulating materials, such as insulation renders, insulation panels or external thermal insulation composite systems.

For further details regarding this aspect of the present invention, reference may be made to the preceding observations regarding the method of the present invention and also regarding the aerogel of the present invention, which apply mutatis mutandis in respect of the use according to the present invention.

Finally, the present invention according to a fourth aspect of the present invention yet further provides a method for producing a silica aerogel, especially a hydrophobicized silica aerogel, by drying a hydrogel, characterized in that the method includes multiple, especially two or more, stages wherein
(a) a first stage comprises drying the hydrogel at temperatures in the range from 10 to 60° C., especially from 20 to 50° C., preferably from 30 to 40° C., and subsequently
(b) a second stage comprises drying the hydrogel at temperatures in the range from 60 to 275° C., especially from 80 to 250° C., preferably from 100 to 230° C., more preferably from 150 to 200° C.

Particularly good results are obtained in the context of the present invention when the first stage is conducted for a period of 8 to 72 hours, especially 12 to 60 hours, preferably 24 to 48 hours.

It will likewise prove advantageous when the second stage is conducted for a period of 0.2 to 10 hours, especially 0.5 to 5 hours, preferably 1 to 2 hours.

The method which the present invention provides for producing silica aerogels from hydrogels consists of a specific multi-stage, especially two-stage, drying process for the hydrogel and is particularly useful in the production of hydrophobicized silica aerogels.

The method of the present invention allows a particularly gentle form of drying the hydrogels and thus the production and isolation of aerogels even especially when water is used as dissolving/dispersing medium. Water has a polarity which typically makes it very difficult to remove from the pores of silica aerogels. This is typically successfully accomplished even in the case of hydrophobicized silica aerogel only if a laborious and often repeated exchange of water for more apolar dissolving media, an example is n-hexane, is carried out and is usually yet carried out via an alkogel stage where water is first exchanged for methanol. These burdensome processing steps and/or stages are avoidable by virtue of the drying process according to the present invention.

For further details regarding this aspect of the present invention, reference may be made to the above observations regarding the other aspects of the present invention, which likewise apply in relation to the method which the present invention provides for producing silica aerogels from hydrogels by drying.

The subject matter of the present invention will now be clarified by the working examples which follow, which describe the subject matter of the present invention exemplarily, without having any limiting effect whatsoever.

Working Examples

Producing an Aerogel
The synthesis of a silica aerogel using the method of the present invention will now be described.
1. Producing a Hydrosol
   A commercial sodium silicate solution is diluted with deionized water to about 5 wt % of sodium silicate, based on the total weight of the solution, and passed through a strongly acidic cation exchange resin based on sulfonated and divinylbenzene-crosslinked polystyrene. The reaction product obtained is a hydrosol having a conductivity of about 900 µS/cm. The sodium ions of the silicate have therefore been nearly completely replaced by protons.
2. Producing a Hydrogel
   The hydrosol obtained in step 1 is adjusted to pH 3 with aqueous ammonia solution. Immediately thereafter, the sol is admixed with a dispersion of 50 wt % of octyltriethoxysilane in water to establish a weight-based ratio of 1:3 for dissolved sol particles, i.e., orthosilicic acid, to silane. The mixture is then heated to a temperature of 60° C. and maintained at 60° C. for 7 hours, in the course of which a hydrogel is formed as a viscid pasty mass.
3. Producing the Aerogel
   The hydrogel obtained in step 2 is segregated from excess water by filtration and poured out on a plate. The hydrogel then dries at room temperature for about 3 hours and is subsequently comminuted, with a grid, to particle sizes in the range from 0.5 to 5 mm. The dimensionally stable hydrogel particles thus obtained are subsequently dried in a conditioning chamber at 85° C. for 41 hours.

The aerogel obtained has the following properties:
particle size: 0.5 to 5 mm
density: 0.15 to 0.16 g/cm³
contact angle: >130°
thermal conductivity: 0.019 to 0.025 W/(mK)
pore diameter: 100 to 200 nm
transmissivity: none The aerogel obtained is very useful as insulant and also for incorporation into insulation renders. Moreover, no harmful, poisonous or flammable chemistries are employed during the synthesis of the aerogel.

What is claimed is:

1. A method for producing silica aerogels comprising,
    (a) first, producing a hydrosol from one or more precursors;
    (b) secondly reacting the hydrosol in the presence of one or more hydrophobicizing agents to form a hydrogel, wherein the hydrophobicizing agent is selected from the group consisting of silanes, polysiloxanes, siliconates and combinations thereof, and
    (c) thirdly, processing the hydrogel obtained in step (b) into an aerogel, wherein the hydrogel obtained in step (b) is isolated, and thereafter optionally comminuted and subsequently dried,
    wherein a dissolving or dispersing medium is used to carry out the process, wherein one dissolving or dispersing medium consists only of water.

2. The method of claim 1, wherein reacting the hydrosol in the presence of one or more hydrophobicizing agents involves reacting the hydrosol with a polysiloxane having a reactive functional group.

3. The method of claim 2, wherein reacting the hydrosol in the presence of one or more hydrophobicizing agents involves reacting the hydrosol with a polysiloxane having a reactive functional group, selected from the group consisting of a hydroxyl group, an amine group and a carboxyl group.

4. The method of claim 1, wherein reacting the hydrosol in the presence of one or more hydrophobicizing agents involves reacting the hydrosol with a polysiloxane having a weight-average molar mass $M_w$ in the range from 250 to 50 000 g/mol.

5. The method of claim 1, wherein reacting the hydrosol in the presence of one or more hydrophobicizing agents involves reacting the hydrosol with a silane having a general formula I, $$R^1_n SiR^2_{4-n} \quad (I)$$

wherein,
    n is a numeral ranging from 1 to 3;
    $R^1$ is a substitutent selected from the group consisting of $C_1$- to $C_{30}$-alkyl, $C_6$- to $C_{30}$-aryl, and combinations thereof, and
    $R^2$ is a substituent selected from the group consisting of a halide, OX, and combinations thereof wherein X is selected from the group consisting of hydrogen, alkyl, aryl, polyether, a carboxylic acid derivative, and combinations thereof.

6. The method of claim 1, wherein reacting the hydrosol in the presence of one or more hydrophobicizing agents involves reacting the hydrosol with a siliconate having a general formula general formula II, $$HO-[Si(R)(OM)-O-]_n H \quad (II)$$

wherein
    n is a numeral ranging from 1 to 6;
    R is a substitutent selected from the group consisting of $C_1$- to $C_{10}$-alkyl, $C_6$- to $C_{15}$-aryl, and combinations thereof, and
    M is a monovalent metal.

7. The method of claim 6, wherein reacting the hydrosol in the presence of one or more hydrophobicizing agents, involves reacting the hydrosol with a siliconate having a general formula general formula II, wherein the monovalent metal M is an alkali metal.

8. The method of claim 6, wherein reacting the hydrosol in the presence of one or more hydrophobicizing agents, involves reacting the hydrosol with a siliconate having a general formula general formula II, wherein the alkali metal is selected from the group consisting of sodium, potassium, and combinations thereof.

9. The method of claim 1, wherein producing the hydrosol from one or more precursors involves producing the hydrosol from a solution or dispersion of one or more precursors in amounts of 0.01 to 20 wt %, based on the solution or dispersion of one or more precursors.

10. The method of claim 9, wherein producing the hydrosol from one or more precursors involves producing the hydrosol from a precursor selected from the group consisting of a monosilicic acid, a colloidal silica, an alkali metal silicate solution, and combinations thereof.

11. The method of claim 10, wherein producing the hydrosol from one or more precursors involves producing the hydrosol from a sodium silicate solution.

12. The method of claim 1, wherein reacting the hydrosol in the presence of one or more hydrophobicizing agents involves reacting a hydrosol having a pH in the range from about 1 to about 6.

13. The method of claim 1, wherein reacting the hydrosol in the presence of one or more hydrophobicizing agents involves reacting a hydrosol having a 20° C. conductivity in a range of from about 10 to about 1200 µS/cm.

14. The method of claim 1, wherein producing a hydrosol from one or more precursors is carried out at about room temperature.

15. The method of claim 1, wherein reacting the hydrosol in the presence of one or more hydrophobicizing agents, includes reacting a hydrosol in a solution or dispersion having a pH ranging from about 3.5 to about 7.

16. The method of claim 1, wherein reacting the hydrosol in the presence of one or more hydrophobicizing agents involves reacting the hydrosol with a solution or dispersion of the hydrophobicizing agent containing the hydrophobicizing agent in amounts of from about 1 to about 90 wt %, based on the solution or dispersion of the hydrophobicizing agent.

17. The method of claim 1, wherein reacting the hydrosol in the presence of one or more hydrophobicizing agents involves reacting a weight-based ratio of hydrosol particles and hydrophobicizing agent ranging from about 10:1 to about 1:20.

18. The method of claim 1, wherein reacting the hydrosol in the presence of one or more hydrophobicizing agents involves mixing the hydrophobicizing agent and the hydrasol, having an established pH, for from about 0.1 to about 60 min.

19. The method of claim 1, wherein reacting the hydrosol in the presence of one or more hydrophobicizing agents involves heating the mixture including the hydrosol and the hydrophobicizing agent to temperatures in the range of from about 30 to about 90° C.

20. The method of claim 1, wherein processing the hydrogel obtained by reacting the hydrosol in the presence of one or more hydrophobicizing agents into an aerogel, involves comminuting the hydrogel to absolute sizes in the range from about 0.01 to about 10 mm.

* * * * *